United States Patent
Bagley et al.

(10) Patent No.: US 10,705,616 B2
(45) Date of Patent: Jul. 7, 2020

(54) SELECTOR DIAL FOR A VEHICLE THAT INCORPORATES ELECTRIC MOTOR FOR DEFINING RECONFIGURABLE MAGNETIC DETENTS

(71) Applicant: GHSP, Inc., Grand Haven, MI (US)

(72) Inventors: John Thomas Bagley, Grand Haven, MI (US); Jeffrey Bays, Grand Haven, MI (US)

(73) Assignee: GHSP, Inc., Grand Haven, MI (US)

(*) Notice: Subject to any disclaimer, the term of this patent is extended or adjusted under 35 U.S.C. 154(b) by 0 days.

(21) Appl. No.: 16/190,698

(22) Filed: Nov. 14, 2018

(65) Prior Publication Data

US 2020/0150766 A1   May 14, 2020

(51) Int. Cl.
| | |
|---|---|
| *G06F 3/01* | (2006.01) |
| *G06F 3/0362* | (2013.01) |
| *H02K 37/14* | (2006.01) |
| *B60K 35/00* | (2006.01) |
| *B60Q 9/00* | (2006.01) |

(52) U.S. Cl.
CPC ............. *G06F 3/016* (2013.01); *B60K 35/00* (2013.01); *B60Q 9/00* (2013.01); *G06F 3/0362* (2013.01); *H02K 37/14* (2013.01); *B60K 2370/126* (2019.05); *B60K 2370/155* (2019.05)

(58) Field of Classification Search
CPC ....... G06F 3/016; G06F 3/0362; B60K 35/00; B60K 2370/126; B60K 2370/155; B60Q 9/00; H02K 37/14
See application file for complete search history.

(56) References Cited

U.S. PATENT DOCUMENTS

| | | | |
|---|---|---|---|
| 3,372,512 A | 3/1968 | Watkins et al. | |
| 4,647,889 A | 3/1987 | Addis | |
| 5,220,260 A | 6/1993 | Schuler | |
| 6,154,201 A * | 11/2000 | Levin ................. | G01C 21/3664 345/156 |
| 6,320,487 B1 | 11/2001 | Miller et al. | |
| 7,619,376 B2 | 11/2009 | Hiroe et al. | |
| 7,671,851 B1 | 3/2010 | Pryor | |
| 8,424,162 B2 | 4/2013 | Prest | |
| 9,778,760 B1 | 10/2017 | Huang et al. | |
| 9,811,066 B1 * | 11/2017 | Linnell ................. | G06F 3/016 |
| 9,922,784 B2 | 3/2018 | Levay et al. | |
| 2001/0052893 A1 * | 12/2001 | Jolly ..................... | B62D 5/006 345/156 |
| 2005/0119799 A1 * | 6/2005 | Dupont ................. | B60K 37/02 701/1 |
| 2013/0154405 A1 * | 6/2013 | Trung .................... | H02K 37/18 310/49.37 |
| 2015/0202936 A1 * | 7/2015 | Becker .................... | B60G 9/00 280/124.106 |

* cited by examiner

*Primary Examiner* — Stephen G Sherman
(74) *Attorney, Agent, or Firm* — Price Heneveld LLP

(57) ABSTRACT

A selector for a vehicle includes a stepper motor. A manually operable rotating portion is in communication with the stepper motor. A display screen is positioned proximate the rotating portion. A position sensor is in communication with the stepper motor and the manually operable rotating portion. The rotating portion is coupled to the stepper motor at a drive shaft of the stepper motor. Manual operation of the rotating portion also rotates the drive shaft. The stepper motor applies a haptic component to the manual operation of the rotating portion.

18 Claims, 7 Drawing Sheets

SELECTOR DIAL FOR A VEHICLE THAT INCORPORATES ELECTRIC MOTOR FOR DEFINING RECONFIGURABLE MAGNETIC DETENTS

FIELD OF THE INVENTION

The present invention generally relates to selector dials for vehicles, and more specifically, a manually operated selector dial for a vehicle that includes an electric motor for defining magnetic detents and other haptic feedback that can be reconfigured during use.

BACKGROUND OF THE INVENTION

Within conventional vehicles, rotationally-operated selector dials can be utilized for making selections for controlling various aspects of the vehicle. These selector dials can include multiple positions that can be identified by various detents positioned around the selector dial. Where mechanical detents are used, these are fixed in location with respect to the selector dial. Because of this, the selector dial can typically only include a certain number of potential selection positions that can be accessed by the user.

SUMMARY OF THE INVENTION

According to one aspect of the present invention, a selector for a vehicle includes a stepper motor. A manually operable rotating portion is in communication with the stepper motor. A display screen is in communication with the rotating portion. A position sensor is in communication with the stepper motor and the manually operable rotating portion. The rotating portion is coupled to the stepper motor at a drive shaft of the stepper motor. Manual operation of the rotating portion also rotates the drive shaft. The stepper motor applies a haptic component to the manual operation of the rotating portion.

According to another aspect of the present invention, a rotational selector knob for a vehicle includes a two-phase stepper motor having a drive shaft and a rotor having a plurality of rotor magnets. A manually operable rotating portion is coupled to the drive shaft. A display screen is in communication with the rotating portion. A user interface is in communication with the display screen. A position sensor is in communication with the stepper motor and the manually operable rotating portion. The user interface operates a plurality of selector categories that are selectively and alternatively displayed on the display screen. Operation of the user interface modifies the display screen to include a plurality of rotational set points that correspond to an identified category of the plurality of selector categories. The rotating portion is selectively and manually rotated between the plurality of rotational set points of the identified category. The position sensor monitors a position of the rotating portion with respect to the plurality of rotational set points. The position sensor is in communication with the stepper motor. Operation of the rotating portion to a set point of the plurality of set points operates the stepper motor to define a haptic component with in the rotating portion.

According to another aspect of the present invention, a method for operating a vehicle selector knob. A user interface is operated to select an identified category of a plurality of selector categories. A plurality of rotational set points correspond to the identified category. A rotating portion that is attached to a drive shaft of a stepper motor is manually operated. A haptic component is applied to a manual operation of the rotating portion when the rotating portion reaches a rotational set point of the plurality of rotational set points. The haptic component includes one of a detent force that at least partially locates the rotating portion at the rotational set point and a consistent drag component that opposes the manual operation of the rotating portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
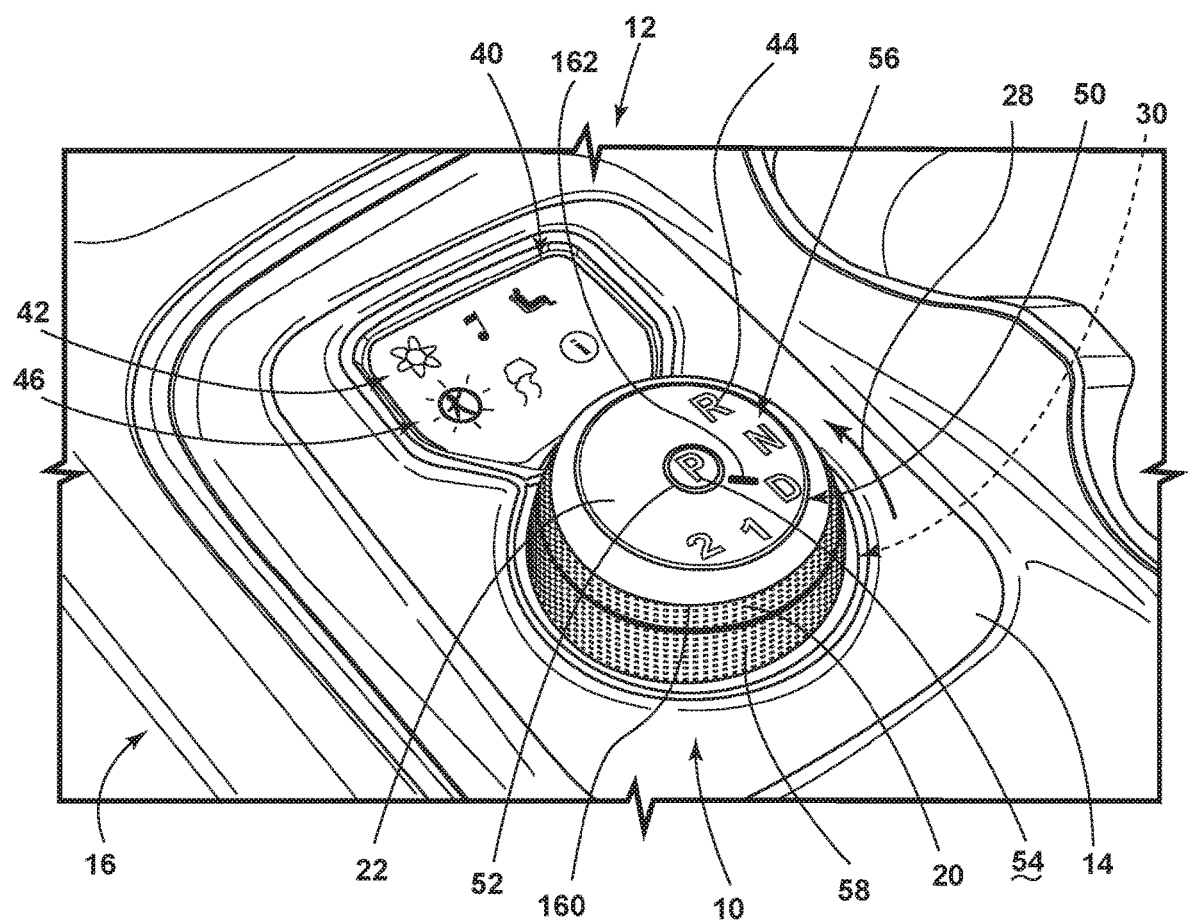
FIG. 1 is a top perspective view of a selector knob incorporating an aspect of the reconfigurable magnetic detents.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-9, reference numeral 10 generally refers to a selector knob that is utilized within a vehicle 12 for making various selections with respect to aspects of the vehicle 12. The selector knob 10 can be incorporated within an instrument panel, console 14, steering wheel, or other similar area within the passenger compartment 16 of the vehicle 12. According to various aspects of the device, the selector knob 10 for the vehicle 12 can include a stepper motor 18 and a manually operable rotating portion 20 that is in communication with the stepper motor 18. A display screen 22 is positioned to be in communication with the rotating portion 20. A position sensor 24 is in communication with the stepper motor 18 and the manually operable rotating portion 20. Typically, the rotating portion 20 is coupled to the stepper motor 18 at a drive shaft 26 of the stepper motor 18. Manual operation 28 of the rotating portion 20 also serves to manually operate the drive shaft 26. Utilizing the position sensor 24 and the stepper motor 18, the stepper motor 18 applies an electromotive haptic component 30 to the manual operation 28 of the rotating portion 20 as the rotating portion 20 is moved about a central rotational axis 32.

Referring again to FIGS. 1-9, the selector knob 10 can include a user interface 40 that can be a separate component or can be incorporated into a portion of the selector knob 10. The user interface 40 can be operated to reconfigure the selector knob 10 to correspond to any one of a plurality of selector categories 42. These plurality of selector categories 42 can be selectively and alternatively displayed on the display screen 22 in the form of a plurality of set points 44 that correspond to an identified category 46 of the plurality of selector categories 42. Upon operation of the user interface 40, the display screen 22 can be reconfigured to include the plurality of rotational set points 44 that correspond to the identified category 46. In this manner, each identified category 46 of the plurality of selector categories 42 can include a unique set of corresponding rotational set points 44. The display screen 22 can be positioned in any one or more of various locations of the vehicle 12. Such locations can include, but are not limited to, the instrument panel, a center console, as part of a heads-up display, on the selector knob 10, or other location within the vehicle 12.

Figure 7:
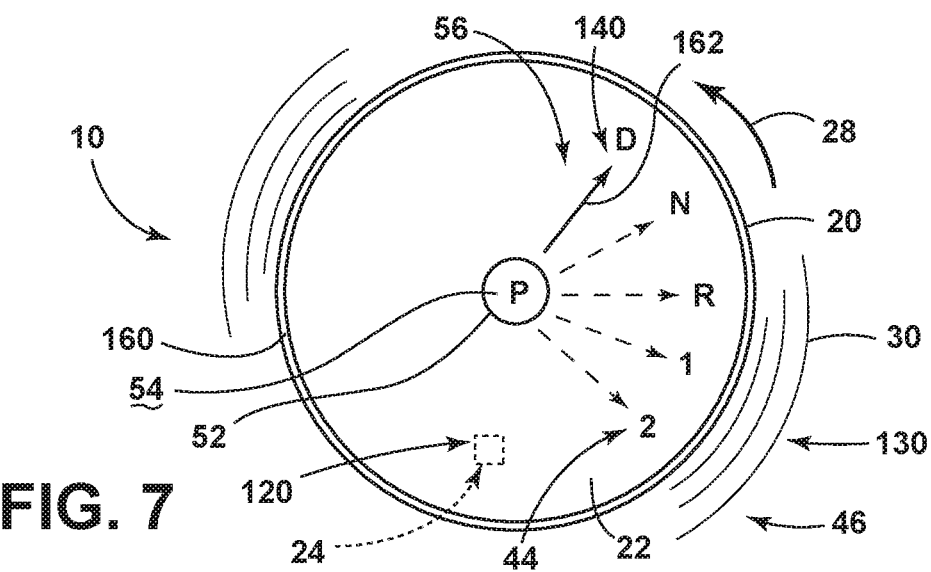
FIG. 7 is a top plan view of an aspect of the display screen for the selector knob showing an exemplary aspect of the plurality of set points related to an identified category of a plurality of selector categories.
Figure 8:
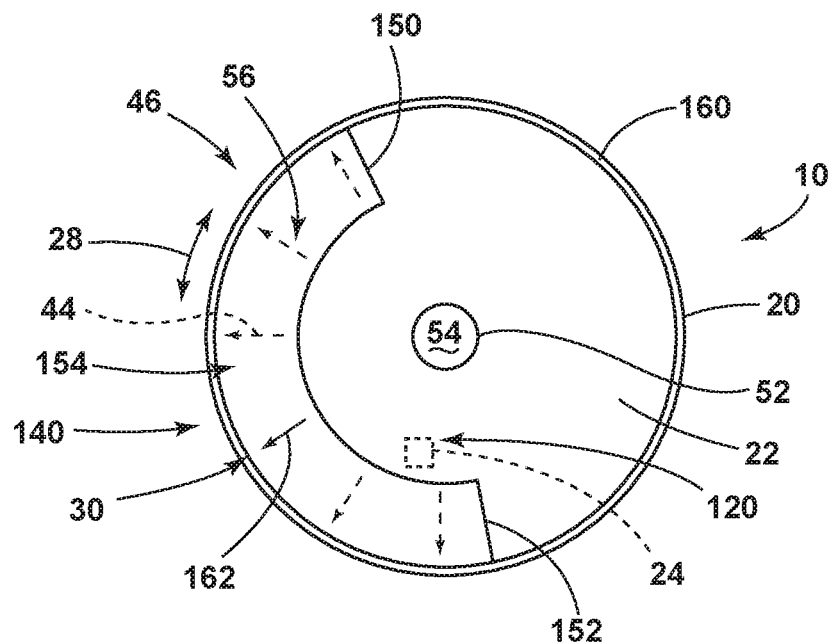
FIG. 8 is a schematic representation of a selector dial showing a plurality of set points that corresponds to an identified category of the plurality of selector categories.
Figure 9:
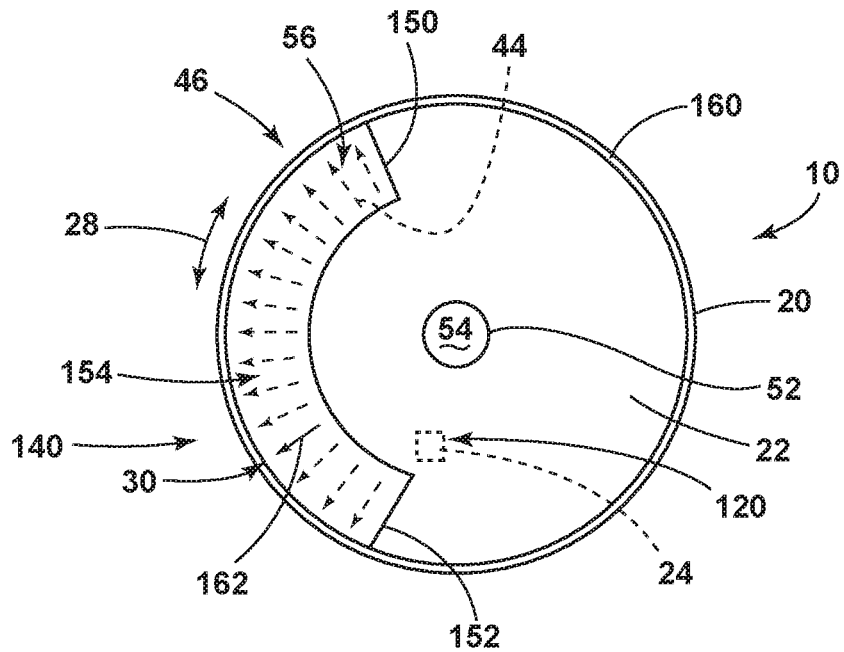
FIG. 9 is a schematic view of the display screen of FIG. 8 showing reconfigured set points that correspond to a separate identified category of the plurality of selection categories.
Figure 10:
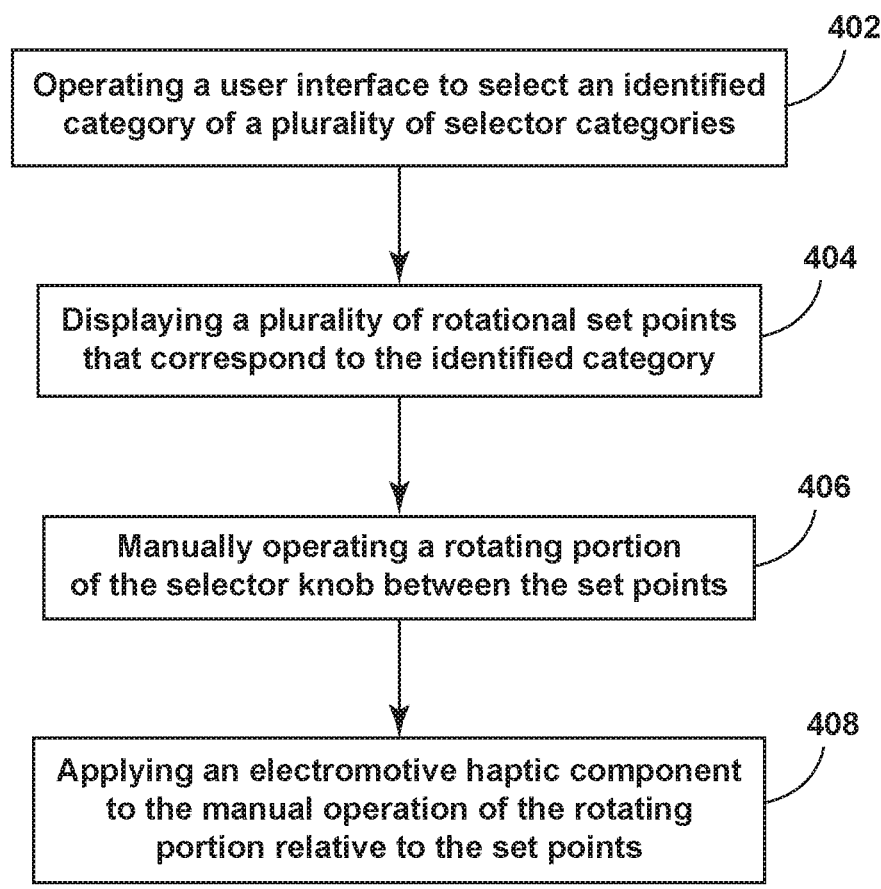
FIG. 10 is a schematic flow diagram illustrating a method for operating a selector knob utilizing a plurality of reconfigurable magnetic detents.

By way of example, and not limitation, one identified category 46 can include a gear shift 50 (exemplified in FIGS. 1 and 7) that includes a plurality of rotational set points 44 that correspond to various transmission settings for the vehicle 12. As indicated in FIG. 7, these rotational set points 44 can correspond to drive (D), neutral (N), reverse (R), as well as multiple individual gear settings in addition to D, N and R. These plurality of set points 44 can also include a setting for park (P). Additionally, a specific setting for "park" can be included within a separate interface for ensuring that the vehicle 12 is in a park position when desired. This separate selector can be in the form of a separate interface, such as a selector button 52. This selector button 52 can be positioned near the selector knob 10, near the display 22, on the steering wheel, or within another portion of the vehicle.

Additionally, in various embodiments, the display screen 22 can include and can encompass the selector button 52 such that the display screen 22, as well as the top surface 54 of the selector button 52, can each be reconfigured based on the identified category 46 that is accessed by the user interface 40. Where a separate identified category 46 is accessed, the display screen 22 and the top surface 54 of the selector button 52 can be reconfigured to display a separate and reconfigured indicia 56 that correspond to the respective set of rotational set points 44.

According to various aspects of the device, the user interface 40 can be positioned near the selector knob 10. It is also contemplated that the user interface 40 can be a secondary rotational selector 58 that is positioned near the manually operable rotating portion 20. This secondary rotational selector 58 can be manipulated to scroll through the plurality of selector categories 42 to arrive at the identified category 46 desired by the user. The user interface 40 can also be positioned within a separate portion of the vehicle 12, such as within an instrument panel, console 14, steering wheel, or other conveniently accessible portion of the vehicle 12 for operating the user interface 40.

Referring again to FIGS. 2-4, the selector knob 10 can include an electric motor that is coupled to the rotating portion 20 of the selector knob 10 via a drive shaft 26. According to various aspects, the electric motor can be a stepper motor 18, such as a bipolar hybrid stepper motor, a direct drive motor, servo motor, or other similar electric motor. Typically, the electric motor will be in the form of a stepper motor 18. The stepper motor 18 used in the various aspects of the selector knob 10 can include a rotor 70 having a tooth geometry having a plurality of teeth 72 defined within the outer perimeter 74 of the rotor 70. By way of example and not limitation, the tooth geometry of the rotor 70 can include as few as two teeth 72 or can include, more typically 200 or 400 teeth 72 defined within the outer perimeter 74 of the rotor 70. Additionally, a rotor magnet 76 is typically disposed on the end of each tooth 72 of the rotor 70. Accordingly, the stepper motor 18 having 200 teeth 72 can include 200 magnets. According to various aspects of the device, the stepper motor 18 can include a rotor 70 with up to approximately 400 teeth 72 or more. Each of these teeth 72 can include a dedicated rotor magnet 76 that is attached to a portion of the respective tooth 72. Using large numbers of teeth 72 and rotor magnets 76, each rotational set point 44 can correspond to a particular tooth 72, to a particular rotational position of the rotor 70 or to a rotational distance that the rotor 70 moves relative to the poles 122 of the stator 80.

By including a large number of magnets within the rotor 70 for the stepper motor 18, very precise manual operation 28 of the rotating portion 20 of the selector knob 10 can be achieved. Additionally, by using a large number of rotor magnets 76, it is possible to reconfigure the plurality of set points 44 for any given identified category 46 that can be controlled by the selector knob 10.

In various aspects of the device, the stepper motor 18 can typically include a two-phase stator 80 that can operate in conjunction with the rotor magnets 76 of the rotor 70. During operation of the stepper motor 18, the two phases of the stepper motor 18 can be alternately activated via electrical currents 82 to produce a rotational electromotive force 84 that is transmitted from the two-phase stator 80 and into the rotor 70. The rotor 70, in turn, transmits this rotational electromotive force 84 through the drive shaft 26 and into the rotating portion 20 of the selector knob 10, in the form of the electromotive haptic component 30.

Referring again to FIGS. 1-9, it is contemplated that the rotating portion 20 of the selector knob 10 is manually operable by a user. The inclusion of the stepper motor 18 serves to supplement this manual operation 28 by adding the haptic component 30 to the rotating portion 20. This haptic component 30 can be received and perceived by the user during manual operation 28 of the rotating portion 20 of the selector knob 10. By way of example, and not limitation, as the user rotates the rotating portion 20 of the selector knob 10, the stepper motor 18 may activate to produce a minimal vibration 130 or a detent-like electromotive force 84 when the rotating portion 20 reaches a particular rotational set point 44. The user is able to continuously rotate the rotating portion 20 while also perceiving the haptic component 30 that is delivered to the rotating portion 20 via the drive shaft 26 and the rotor 70.

Figure 2:
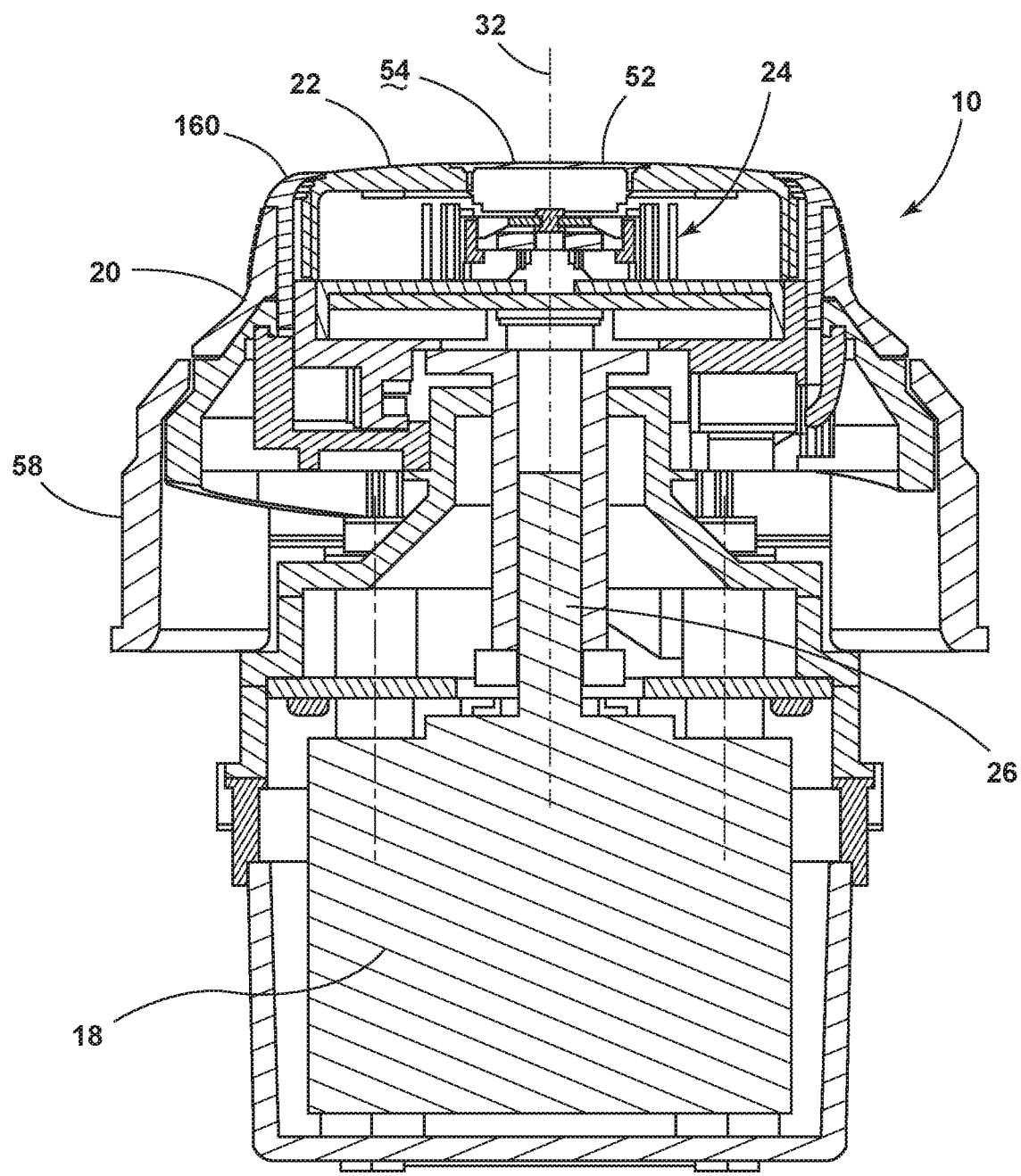
FIG. 2 is a cross-sectional view of an aspect of a selector knob that incorporates an aspect of the reconfigurable magnetic detents.
Figure 3:
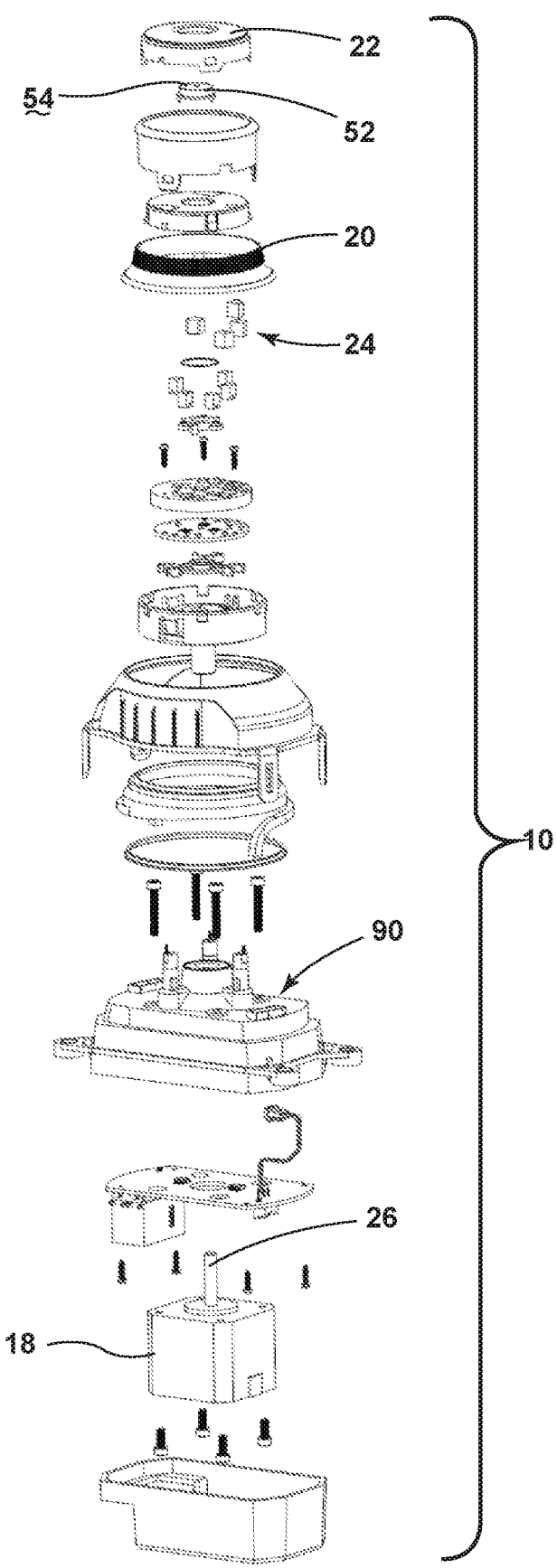
FIG. 3 is an exploded perspective view of the selector knob of FIG. 2.

As exemplified in FIGS. 2 and 3, a position sensor 24 is disposed near the stepper motor 18 in communication with the stepper motor 18 and the rotating portion 20 of the selector knob 10. The position sensor 24 monitors the relative positions of the various rotational set points 44 that correspond to the identified category 46 selected by the user interface 40. As the user manually operates the rotating portion 20, the position sensor 24 monitors the rotational position of the rotating portion 20. When the position sensor 24 senses that the rotating portion 20 is about to reach or has reached a rotational set point 44, the position sensor 24 can communicate to the stepper motor 18 to provide a haptic component 30 to the rotating portion 20. Again, the rotational set point 44 can correspond to a particular rotor magnet 76 of the rotor 70. The communication between the position sensor 24 and the stepper motor 18 can be in direct communication between these two components. This communication can also occur through a processor or controller 90 that processes various information concerning the position of the rotating portion 20 and the plurality of rotational set points 44 for each of the plurality of selector categories 42. The controller 90 combines this information to instruct the stepper motor 18 to provide a particular haptic component 30 to the rotating portion 20 of the selector knob 10.

To provide the haptic component 30, the stepper motor 18 can operate through various steps that are achieved by alternately activating the pair of phases for the two-phase stator 80. During this alternate operation of the two phases for the stepper motor 18, the rotor magnets 76 are manipulated through the electromagnetic communication between the two-phase stator 80 and the plurality of rotor magnets 76. The strength of the electromagnetic force produced between the stator 80 and the rotor magnets 76 produces an electromotive force 84 of a particular magnitude. This electromotive force 84 is configured to be sufficient to produce the haptic component 30. However, it is typical that this electromotive force 84 is not sufficient to overcome the manual operation 28 of the rotating portion 20 by the user. It is also contemplated that certain set points 44 can include a stopping condition where the electromotive force 84 produced between the stator 80 and the rotor magnets 76 is sufficient to stop operation of the rotor 70 and also the rotating portion 20 in at least one direction.

Figure 4:
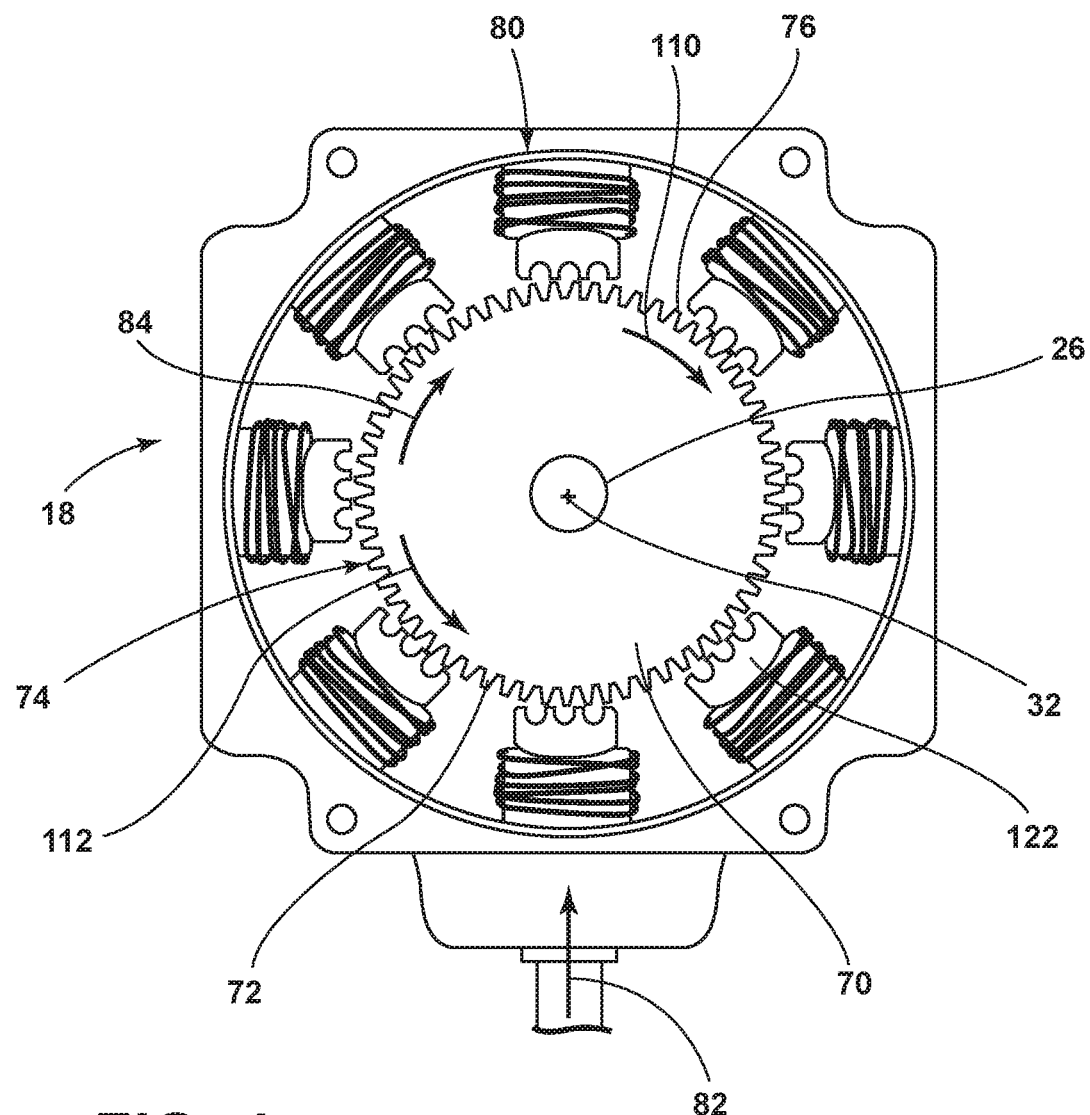
FIG. 4 is a schematic cross-sectional view of a stepper motor that is included within the selector knob for operating the reconfigurable magnetic detents.
Figure 5:
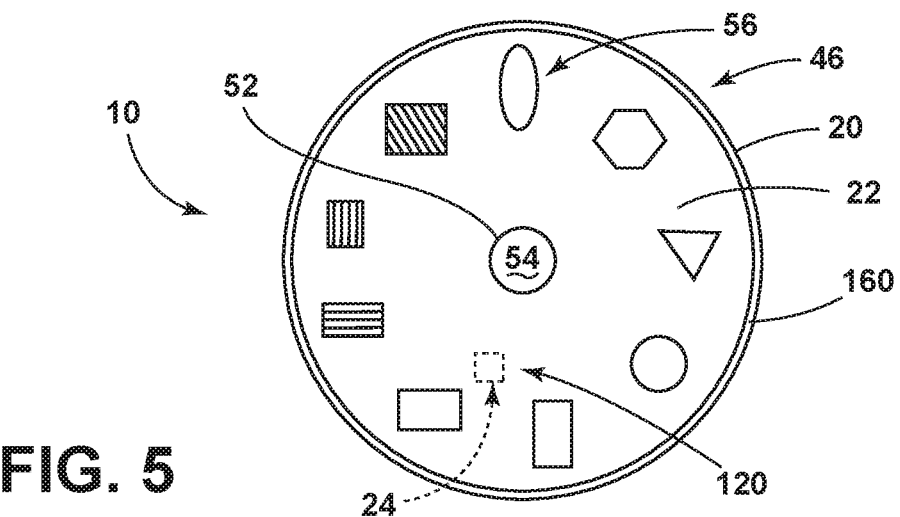
FIG. 5 is a top plan view of the selector knob showing an aspect of the display screen in relation to the reconfigurable magnetic detents.
Figure 6:
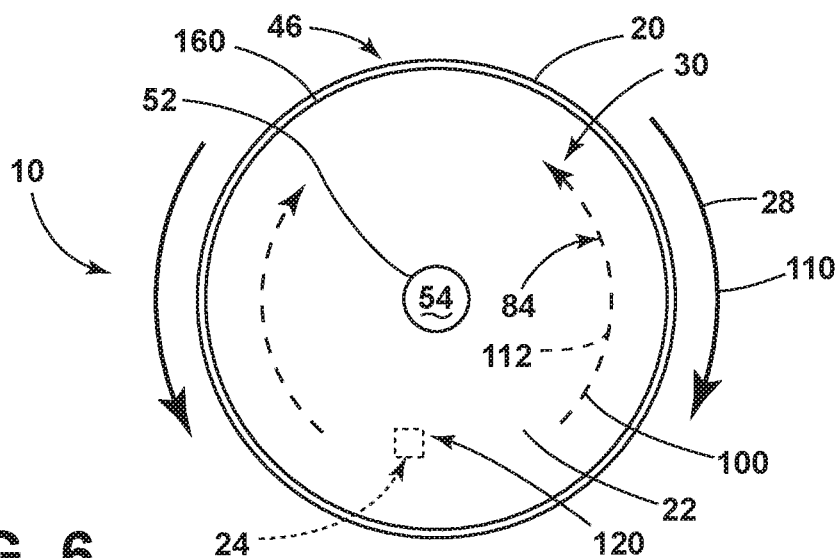
FIG. 6 is a schematic top plan view of the selector knob and showing operation of the stepper motor to produce a haptic feedback in the form of an opposing drag force experienced by the user.

As exemplified in FIGS. 2-4, the two phases of the stator 80 for the stepper motor 18 can also be operated in an alternative and contemporaneous fashion to produce half-step movements of the rotor 70 with respect to the stator 80. These half-step movements of the rotor can produce more finite control of the electromotive haptic component 30, as well as the rotational set points 44 that may be between adjacent rotor magnets 76 for each identified category 46 of the plurality of selector categories 42.

By using the stepper motor 18, operation of the rotating portion 20 of the selector knob 10 can be performed with little friction being experienced by the rotating portion 20. Because the rotor 70 and stator 80 of the stepper motor 18 are in electromagnetic communication, these components are not in direct physical contact with one another. Accordingly, rotation of the rotating portion 20 of the selector knob 10 produces a contemporaneous rotation of the drive shaft 26 and the rotor 70. This rotation is conducted free of any direct physical engagement with the stator 80. Therefore, minimal friction is perceived by the user during manual operation 28 of the rotating portion 20 of the selector knob 10. A perceived amount of friction or drag 100 experienced by the user during manual operation 28 of the rotating portion 20 can be modified by activation of the stepper motor 18. In such an embodiment, the position sensor 24 can sense a direction and speed of rotation that the user manually exerts on the rotating portion 20. The positioning sensor, evaluating this manual operation 28, can send information to the controller 90 for instructing the stepper motor 18 to apply an electromotive force 84 of a certain magnitude and in the opposite direction of the manual operation 28 of the rotating portion 20. This opposing electromotive force 84 can be perceived by the user as a consistent drag component 100 on the rotating portion 20. This drag 100 can give the feel of a more precise control of the rotating portion 20 of the selector knob 10. Additionally, because of the steps and half-step movements of the rotor 70 produced by activation of the poles 122 of the two-phase stator 80, the haptic component 30 in the form of the opposing drag 100 can be perceived as a substantially constant and consistent feel to the user.

By way of example, and not limitation, where a user operates the rotating portion 20 in a clockwise direction 110, the position sensor 24 can sense this motion and instruct the stepper motor 18 to exert the opposing electromotive force 84 on the rotor 70 and the counterclockwise direction 112. Additionally, this electromotive force 84 can be configured to be of a particular magnitude that can be overcome by the manual operation 28 of the rotating portion 20 of the selector knob 10. In this manner, the opposing electromotive force 84 produced by the stepper motor 18 can provide the rotating portion 20 with a more viscous feel produced by the opposing electromotive force 84 or drag 100. This viscous feel can be utilized where a particular identified category 46 includes no particular individual or rotational set points 44, but rather includes a continuous selection range, such as selecting temperature, selecting radio frequencies, selecting radio volume, and other similar range-related categories.

Because the manual operation 28 of the rotating portion 20 of the selector knob 10 is being combined with the haptic component 30, the position sensor 24 is configured to continuously or substantially continuously monitor the rotational position of the rotating portion 20. In this manner, the position sensor 24 is configured to provide positioning data 120 multiple times each second to a processor or controller 90 for operating electrical current 82 delivered to the poles 122 of the stator 80. The position sensor 24, in this configuration, helps to calibrate the magnitude of electrical current 82 and location of electrical current 82 delivered to the two poles 122 of the stator 80. The position sensor 24 and controller 90 can also cooperate to determine which pole 122 should receive the electrical current 82 relative to a particular rotational position of the rotor 70.

As exemplified in FIGS. 1-9, the haptic component 30 can be in the form of a vibration 130 of the rotating portion 20 of the selector knob 10. This vibration 130 can be produced where the position sensor 24 senses that the rotating portion 20 is at or near a particular rotational set point 44. In this condition, the position sensor 24 communicates with a controller 90 to deliver rapidly alternating electrical currents 82 between the poles 122 of the two-phase stator 80. This results in a rapid alternation of an electromotive force 84 between clockwise and counterclockwise directions 110, 112, in relation to the rotational set point 44. This rapid alternation of the electromotive force 84 in each rotational direction is perceived as the vibration 130 in the rotating portion 20 of the selector knob 10. This vibration 130 can be indicative of the rotating portion 20 reaching a particular rotational set point 44.

According to various aspects of the device, the haptic component 30 that is delivered to the rotating portion 20 can be in the form of a magnetic detent 140 that is perceived in a tactile sense by the user. This magnetic detent 140 can be achieved by producing a slightly greater electromotive force 84 when the rotating portion 20 of the selector knob 10 reaches or moves into alignment with a particular rotational set point 44. When the selector knob 10 is moved away from the particular rotational set point 44, the electromotive force 84 is either deactivated or decreased. By increasing and decreasing the electromotive force 84 produced by the stepper motor 18, the user can perceive the existence of the detent at various rotational set points 44 during manual operation 28 of the rotating portion 20.

According to various aspects of the device, the haptic component 30 can be in the form of various stop positions, such as a first and second stop position 150, 152. In each of these first and second stop positions 150, 152, the stepper motor 18 can be operated to prevent an over rotation in the clockwise direction 110 at the first stop position 150 and also operated to prevent an over rotation in the counterclockwise direction 112 at the second stop position 152. These first and second stop positions 150, 152 can be used where it is desired that the rotating portion 20 of the selector knob 10 rotate only within a selected or desired rotational range 154. At each of the first and second stop positions 150, 152, the electromotive force 84 can be activated to fully stop rotation of the rotating portion 20, at least in one direction. Manual operation 28 of the rotating portion 20 in the opposite direction will deactivate or diminish the electromotive force 84 to allow the user to manually operate the rotating portion 20 in a direction away from the first or second stop position 150, 152. Accordingly, these first and second stop positions 150, 152 can be utilized to provide for selection of a plurality of rotational set points 44 within a specified rotational range 154. Additionally, within this rotational range 154, selection of various selection categories can produce differing numbers of rotational set points 44 within this rotational range 154. Using the multiple rotor magnets 76 positioned on the teeth 72 of the rotor 70, the electromagnetic engagement between the stator 80 and the rotor 70 can produce a large number of configurations of rotational set points 44 that can correspond to each identified category 46 of the plurality of selection categories.

According to various aspects of the device, it is contemplated that the stepper motor 18 can be activated to produce the haptic component 30 at each rotational set point 44 of the plurality of rotational set points 44 for the particular identified category 46. It is also contemplated that an identified category 46 can include a plurality of rotational set points 44, only a portion of which may produce or necessitate the haptic component 30 being delivered to the rotating portion 20 of the selector knob 10.

Referring now to FIGS. 5-9, it is contemplated that the display screen 22 can be positioned within the rotating portion 20 of the selector knob 10. In such an embodiment, the rotating portion 20 is a ring that operates around the outer edges 160 of the selector knob 10. Centrally positioned within the rotating portion 20 can be the display screen 22 as well as the central selector button 52 is positioned within the display screen 22.

According to various aspects of the device, as exemplified in FIGS. 1-9, it is contemplated that the position sensor 24 can be in communication with the display screen 22, such that the display screen 22 can be continuously reconfigured during operation of the rotating portion 20 of the selector knob 10. By way of example, and not limitation, during manual operation 28 of the rotating portion 20, a virtual indicator 162 can be moved through the display screen 22 for providing a visual feedback to the user concerning the relative position of the rotating portion 20 with respect to the plurality of rotational set points 44 for the identified category 46. In this manner, the user can utilize both the haptic component 30 and visual feedback for operating the rotating portion 20 of the selector knob 10.

By way of example, and not limitation, where an identified category 46 is selected, the display screen 22 can reflect relative positions of the plurality of rotational set points 44. As the user rotates the rotating portion 20 of the selector knob 10, and the rotor 70 of the stepper motor 18, the virtual indicator 162 can be shown as a graphic that is animated to move through the display screen 22 relative to each of the rotational set points 44 displayed on the display screen 22. As the user continues to operate the rotating portion 20, the virtual indicator 162 may continue to move as an animation through the display screen 22. This animation can be controlled at least partially through operation of the position sensor 24 that monitors and senses the position of the rotating portion 20, as well as the speed of the rotating portion 20 and/or the rotor 70, as it moves around the central rotational axis 32. It is contemplated that certain aspects of the selector knob 10 may not be connected to or be otherwise in communication with a display screen 22. In such an embodiment, the haptic component 30 is the primary indicia provided to the user.

According to various aspects of the device, as exemplified in FIGS. 1-9, the rotational selector knob 10 can include the two-phase stepper motor 18 having a drive shaft 26 and a rotor 70 having a plurality of rotor magnets 76 positioned on the outer perimeter 74 of the rotor 70. The manually operable rotating portion 20 is coupled to the drive shaft 26. The display screen 22 is positioned to be in communication with the rotating portion 20, and a user interface 40 is in communication with the display screen 22. A position sensor 24 is in communication with the stepper motor 18 and the manually operable rotating portion 20, as well as the display screen 22. The user interface 40 is operated to select among a plurality of selector categories 42 that are selectively and alternatively displayed on the display screen 22. Operation of the user interface 40 can serve to modify the display screen 22 to include a plurality of rotational set points 44 that correspond to an identified category 46 of the plurality of selector categories 42. The rotating portion 20 selectively and manually rotate between the plurality of rotational set points 44 of the identified category 46. The position sensor 24 monitors the position of the rotating portion 20 and/or the rotor 70 with respect to the plurality of rotational set points 44. Because the position sensor 24 is in communication with the stepper motor 18, operation of the rotating portion 20 to a particular set point 44 of the plurality of set points 44 operates the stepper motor 18, via the position sensor 24, to define a haptic component 30 within the rotating portion 20. The haptic component 30 can be delivered to the rotating portion 20 via operation of the stepper motor 18 and through the connection of the drive shaft 26 with each of the stepper motor 18 and the rotating portion 20.

Referring now to FIGS. 1-10, having described various aspects of the selector knob 10 that includes a stepper motor 18 for providing reconfigurable rotational set points 44, a method 400 is disclosed for operating a vehicle selector knob 10. According to various aspects of the method 400, a user interface 40 is operated to select an identified category 46 of a plurality of selector categories 42 (step 402). A plurality of rotational set points 44 is displayed on a display screen 22 that corresponds to the identified category 46 (step 404). The rotating portion 20 of the selector knob 10 is then manually operated (step 406). Manual operation 28 of the rotating portion 20 for the selector knob 10 also results in rotation of a drive shaft 26 of the stepper motor 18. Manual operation 28 of the rotating portion 20, in turn, results in an electromotive haptic component 30 being applied to the manual operation 28 of the rotating portion 20 (step 408). When the rotating portion 20 reaches or nears the rotational set point 44 of the plurality of rotational set points 44, the electromotive haptic component 30 is delivered to the rotating portion 20 at least via the drive shaft 26. According to various aspects of the device, the electromotive haptic component 30 can include one of a detent force that partially locates the rotating portion 20 at or near the rotational set point 44. The electromotive haptic component 30 can also include a consistent or substantially consistent drag 100 force that opposes the manual operation 28 of the rotating portion 20.

According to various aspects of the device, the use of the selector knob 10 having the stepper motor 18 for providing reconfigurable rotational set points 44 can be used as a singular user interface 40 that can control multiple systems of the vehicle 12. By way of example, and not limitation, the user interface 40 can select between HVAC controls, entertainment system controls, navigation controls, driving condition selectors, seat-comfort conditions, lighting conditions, and other similar conditions through the use of the user interface 40 in connection with the selector knob 10 having the rotating portion 20. By operating the user interface 40 and the selector knob 10, the interior controls for the passenger compartment 16 of the vehicle 12 can be simplified to include fewer user interface 40 controls. By using the single selector knob 10, several systems can be accessed at a single point of contact within the vehicle 12. By utilizing this single point of contact in the form of a selector knob 10, distractions that may be experienced by a driver of the vehicle 12 can also be minimized.

According to various aspects of the device, the display screen 22 for the selector knob 10 can include various digital displays that can include, but are not limited to, LED displays, LCD displays, high resolution displays, touch screen displays and other similar display mechanisms that can be conveniently viewed by a user or occupant of the vehicle 12. It is also contemplated that the visual feedback provided to a driver of the vehicle 12 through operation of the selector knob 10 can be presented to a head's up display incorporated within a portion of the instrument panel or even on a portion of a windshield. The use of a head's up display can assist the driver of the vehicle 12 in making various selections without substantially diverting the driver's attention away from the environment surrounding the vehicle 12.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A selector for a vehicle, the selector comprising:
   a stepper motor;
   a manually operable rotating portion in communication with the stepper motor;
   a position sensor in communication with the stepper motor and the manually operable rotating portion; and
   a user interface, wherein the user interface operates a plurality of selector categories, wherein operation of the user interface modifies a display screen to include a plurality of rotational set points that correspond to an identified category of the plurality of selector categories, wherein
   the manually operable rotating portion is coupled to the stepper motor at a drive shaft of the stepper motor;
   manual operation of the rotating portion also rotates the drive shaft; and
   the stepper motor applies a haptic component to the manual operation of the rotating portion in relation to the plurality of rotational set points.

2. The selector of claim 1, wherein the display screen is positioned to be in communication with the rotating portion.

3. The selector of claim 2, wherein the position sensor is also in communication with the display screen.

4. The selector of claim 2, wherein each identified category of the plurality of selector categories includes a corresponding set of rotational set points, wherein the rotational set points of each identified category are displayed on the display screen.

5. The selector of claim 1, wherein the stepper motor is a bipolar hybrid stepper motor.

6. The selector of claim 1, wherein the stepper motor includes a rotor having a plurality of teeth, wherein a rotor magnet is disposed on each tooth of the plurality of teeth.

7. The selector of claim 6, wherein the stepper motor includes a rotor having at least 200 teeth and corresponding rotor magnets.

8. The selector of claim 1, wherein the stepper motor includes a two-phase stator.

9. The selector of claim 1, wherein the stepper motor operates to produce the haptic component at each of the rotational set points.

10. The selector of claim 1, wherein the haptic component is a consistent drag component that partially opposes a manual operation of the rotating portion.

11. The selector of claim 1, wherein the haptic component includes first and second stop positions, wherein the stepper motor operates to prevent an over rotation of the rotating portion in a clockwise direction at the first stop position and prevents over rotation of the rotating portion in a counterclockwise direction at the second stop position.

12. A rotational selector knob for a vehicle, the rotational selector knob comprising:
   a two-phase stepper motor having a drive shaft and a rotor having at least 200 rotor magnets;
   a manually operable rotating portion that is coupled to the drive shaft;
   a display screen positioned to be in communication with the rotating portion;
   a user interface in communication with the display screen; and
   a position sensor in communication with the stepper motor and the manually operable rotating portion, wherein
   the user interface operates a plurality of selector categories that are selectively and alternatively displayed on the display screen;
   operation of the user interface modifies the display screen to include a plurality of rotational set points that correspond to an identified category of the plurality of selector categories;

the rotating portion is selectively and manually rotated between the plurality of rotational set points of the identified category;

the position sensor monitors a position of the rotating portion with respect to the plurality of rotational set points;

the position sensor is in communication with the stepper motor;

operation of the rotating portion to a set point of the plurality of rotational set points operates the stepper motor to define a haptic component within the rotating portion; and operation of the user interface selectively adjusts the plurality of selector categories and reconfigures the plurality of rotational set points to define a plurality of reconfigured set points.

13. The rotational selector knob of claim 12, wherein the haptic component includes at least one of a vibration, a detent force, an opposing drag component, and a stop position.

14. The rotational selector knob of claim 12, further comprising:

a selector button disposed proximate the display screen.

15. The rotational selector knob of claim 12, wherein the position sensor is also in communication with the display screen.

16. The rotational selector knob of claim 12, wherein the haptic component is a consistent drag component that opposes a manual operation of the rotating portion.

17. The rotational selector knob of claim 12, wherein the plurality of rotational set points include first and second stop positions, wherein the stepper motor operates to prevent an over rotation in a clockwise direction at the first stop position and prevents over rotation in a counterclockwise direction at the second stop position.

18. A method for operating a vehicle selector knob, the method comprising steps of:

operating a user interface to select an identified category of a plurality of selector categories;

displaying a plurality of rotational set points that correspond to the identified category;

manually operating a rotating portion that is attached to a drive shaft of a stepper motor; and applying a haptic component to a manual operation of the rotating portion when the rotating portion reaches a rotational set point of the plurality of rotational set points, wherein the haptic component includes one of a detent force that at least partially locates the rotating portion at the rotational set point and a consistent drag component that opposes the manual operation of the rotating portion, wherein operation of the user interface selectively changes the identified category and also changes the plurality of rotational set points displayed on a display screen.

\* \* \* \* \*